United States Patent
Murota

(10) Patent No.: US 11,097,392 B2
(45) Date of Patent: Aug. 24, 2021

(54) SPINDLE DEVICE

(71) Applicant: FANUC CORPORATION, Yamanashi (JP)

(72) Inventor: Masahiro Murota, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/525,916

(22) Filed: Jul. 30, 2019

(65) Prior Publication Data
US 2020/0039014 A1    Feb. 6, 2020

(30) Foreign Application Priority Data
Jul. 31, 2018   (JP) .............................. JP2018-143644

(51) Int. Cl.
*B23Q 11/00*     (2006.01)
*B23Q 11/12*     (2006.01)
*B23Q 1/70*     (2006.01)

(52) U.S. Cl.
CPC .............. *B23Q 11/005* (2013.01); *B23Q 1/70* (2013.01); *B23Q 11/127* (2013.01)

(58) Field of Classification Search
CPC ... B23Q 11/005; B23Q 11/006; B23Q 11/127; B23Q 11/141; B23Q 11/0883; B23Q 2220/006
See application file for complete search history.

(56) References Cited

U.S. PATENT DOCUMENTS

| | | | | |
|---|---|---|---|---|
| 4,798,505 A | * | 1/1989 | Ameseder | B05B 1/06 175/208 |
| 4,864,714 A | * | 9/1989 | Von Haas | B23Q 11/005 483/1 |
| 6,220,369 B1 | * | 4/2001 | Yeh | B23Q 11/005 173/197 |
| 2002/0034427 A1 | * | 3/2002 | Senzaki | B23Q 11/127 409/136 |

(Continued)

FOREIGN PATENT DOCUMENTS

| | | |
|---|---|---|
| CN | 101941160 A | 1/2011 |
| CN | 103286678 A | 9/2013 |

(Continued)

OTHER PUBLICATIONS

English Abstract for Japanese Publication No. 2011240428 A, published Dec. 1, 2011, 1pg.

(Continued)

*Primary Examiner* — Ryan C Rufo
(74) *Attorney, Agent, or Firm* — Fredrikson & Byron, P.A.

(57) ABSTRACT

A spindle device includes a cover member. The cover member has, formed therein, a gas flow path configured to flow a compressed gas for providing sealing between a chuck portion as a rotating member and the cover member and sealing between the chuck portion and the spindle housing. The gas flow path includes a first conduit configured to communicate the outside of the cover member and a second conduit configured to allow the first conduit to communicate with a gap between the chuck portion and the spindle housing, the second conduit being larger than the outlet of the first conduit. The outlet of the second conduit faces a surface of the spindle housing.

4 Claims, 7 Drawing Sheets

(56) References Cited

U.S. PATENT DOCUMENTS

| | | | | |
|---|---|---|---|---|
| 2011/0280679 | A1 | 11/2011 | Morimura | |
| 2015/0367469 | A1* | 12/2015 | Kobayashi | ............... B23C 9/005 409/137 |
| 2019/0128421 | A1* | 5/2019 | Tsai | ........................ B23Q 1/70 |
| 2019/0308251 | A1* | 10/2019 | Yamamoto | ........... B23Q 3/1554 |

FOREIGN PATENT DOCUMENTS

| | | | | |
|---|---|---|---|---|
| CN | 107598193 | A | | 1/2018 |
| CN | 107790747 | A | | 3/2018 |
| DE | 4015241 | A1 | * 11/1991 | ......... B23Q 11/0883 |
| DE | 10317336 | A1 | * 11/2004 | ............... B23Q 1/42 |
| DE | 102004040166 | A1 | * 3/2006 | ......... B23Q 11/1046 |
| GB | 665384 | A | * 1/1952 | ............ B23Q 11/005 |
| JP | 58109246 | A | * 6/1983 | ............... B23B 29/04 |
| JP | 07237083 | A | * 9/1995 | |
| JP | 2001232537 | A | * 8/2001 | ......... B23Q 11/0883 |
| JP | 2001315008 | A | * 11/2001 | |
| JP | 2003291048 | A | * 10/2003 | |
| JP | 2011240428 | A | | 12/2011 |
| JP | 2013103299 | A | | 5/2013 |
| JP | 201812142 | A | | 1/2018 |
| JP | 2020001121 | A | | 1/2020 |
| JP | 2020015098 | A | | 1/2020 |
| JP | 2020019085 | A | | 2/2020 |
| KR | 102007070363 | A | * 7/2007 | |
| KR | 100973396 | B1 | * 7/2010 | |

OTHER PUBLICATIONS

English Machine Translation for Japanese Publication No. 2018012142 A, published Jan. 25, 2018, 7pgs.
English Abstract and Machine Translation for Japanese Publication No. JP2020-001121A, published Jan. 9, 2020, 13 pgs.
English Abstract and Machine Translation for Japanese Publication No. JP2020-015098A, published Jan. 30, 2020, 13 pgs.
English Abstract and Machine Translation for Japanese Publication No. JP2020-019085A, published Feb. 6, 2020, 11 pgs.
English Abstract and Machine Translation for Chinese Publication No. CN101941160A, published Jan. 12, 2011, 6 pgs.
English Abstract and Machine Translation for Japanese Publication No. JP2013-103299A, published May 30, 2013, 8 pgs.
English Abstract and Machine Translation for Chinese Publication No. CN103286678A, published Sep. 11, 2013, 7 pgs.
English Abstract and Machine Translation for Chinese Publication No. CN107598193A, published Jan. 19, 2018, 14 pgs.
English Abstract and Machine Translation for Chinese Publication No. CN107790747A, published Mar. 13, 2018, 8 pgs.

* cited by examiner

SPINDLE DEVICE

CROSS-REFERENCE TO RELATED APPLICATION

This application is based upon and claims the benefit of priority from Japanese Patent Application No. 2018-143644 filed on Jul. 31, 2018, the contents of which are incorporated herein by reference.

BACKGROUND OF THE INVENTION

Field of the Invention

The present invention relates to a spindle device used in a lathe (machine tool) that machines a workpiece using a tool.

Description of the Related Art

There are cases where a spindle housing or the like for accommodating a spindle shaft is thermally deformed due to heat generated during machining on a workpiece, and such thermal deformation causes decrease in machining accuracy. It is therefore important to take countermeasures to suppress the thermal deformation.

For example, Japanese Laid-Open Patent Publication No. 2011-240428 discloses a cooling structure for cooling a spindle by providing coolant passages both in the housing and the spindle so as to circulate a coolant from the coolant passage in the housing to the coolant passage in the spindle and thereby flow the coolant through the inside of the spindle.

In the housing disclosed in Japanese Laid-Open Patent Publication No. 2011-240428, seal air feed holes for supplying air from an air supply source are formed so as to connect the outer peripheral surface of the housing with the outer peripheral surface of the spindle. The opening on the outer peripheral surface of the spindle in the seal air feed hole is connected to the gap between the outer peripheral surface of the spindle and the housing.

SUMMARY OF THE INVENTION

Incidentally, the air used for sealing is generally in a compressed state. For this reason, in Japanese Laid-Open Patent Publication No. 2011-240428, the air flowing from the seal air feed hole to the gap between the outer peripheral surface of the spindle and the housing may be adiabatically expanded to thereby decrease the temperature of the air.

In this case, the air flowing in the gap between the outer peripheral surface of the spindle and the housing causes temperature difference between portions inside the housing, so that there is a concern that the temperature variations may cause thermal deformation in the housing. In recent years, there are cases where machining on a workpiece should be controlled at nanometer levels. In such a case, even if the amount of thermal deformation caused during machining is very small, decrease in machining accuracy tends to emerge. Therefore, there is a strong demand for measures to suppress the decrease in machining accuracy due to thermal deformation.

It is therefore an object of the present invention to provide a spindle device which can suppress the decrease in machining accuracy due to thermal deformation.

According to an aspect of the present invention, a spindle device includes: a spindle housing; a spindle shaft configured to be rotatably supported inside the spindle housing; a rotating member disposed at one end of the spindle shaft and configured to be rotatable in conjunction with rotation of the spindle shaft; an annular flange portion projecting outward from the outer peripheral surface of the spindle housing; and a cover member configured to cover a surface of the flange portion on one end side of the spindle shaft, an outer peripheral surface of the spindle housing that extends from the surface of the flange portion toward the one end side of the spindle shaft, and an outer peripheral surface of the rotating member, a temperature of the cover member being adjusted. The cover member has, formed therein, a gas flow path configured to flow a compressed gas for providing sealing between the rotating member and the cover member and sealing between the rotating member and the spindle housing; the gas flow path includes a first conduit configured to communicate with the outside of the cover member; a second conduit configured to allow the first conduit to communicate with a gap between the rotating member and the spindle housing, the second conduit being larger than an outlet of the first conduit; and an outlet of the second conduit is configured to face a surface of the spindle housing.

According to the present invention, temperature variation between portions of the spindle housing caused by the compressed gas becomes unlikely to occur. Therefore, thermal deformation of the spindle housing due to local temperature variation in the spindle housing can be reduced. As a result, it is possible to suppress the decrease in machining accuracy caused by thermal deformation of the spindle housing.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
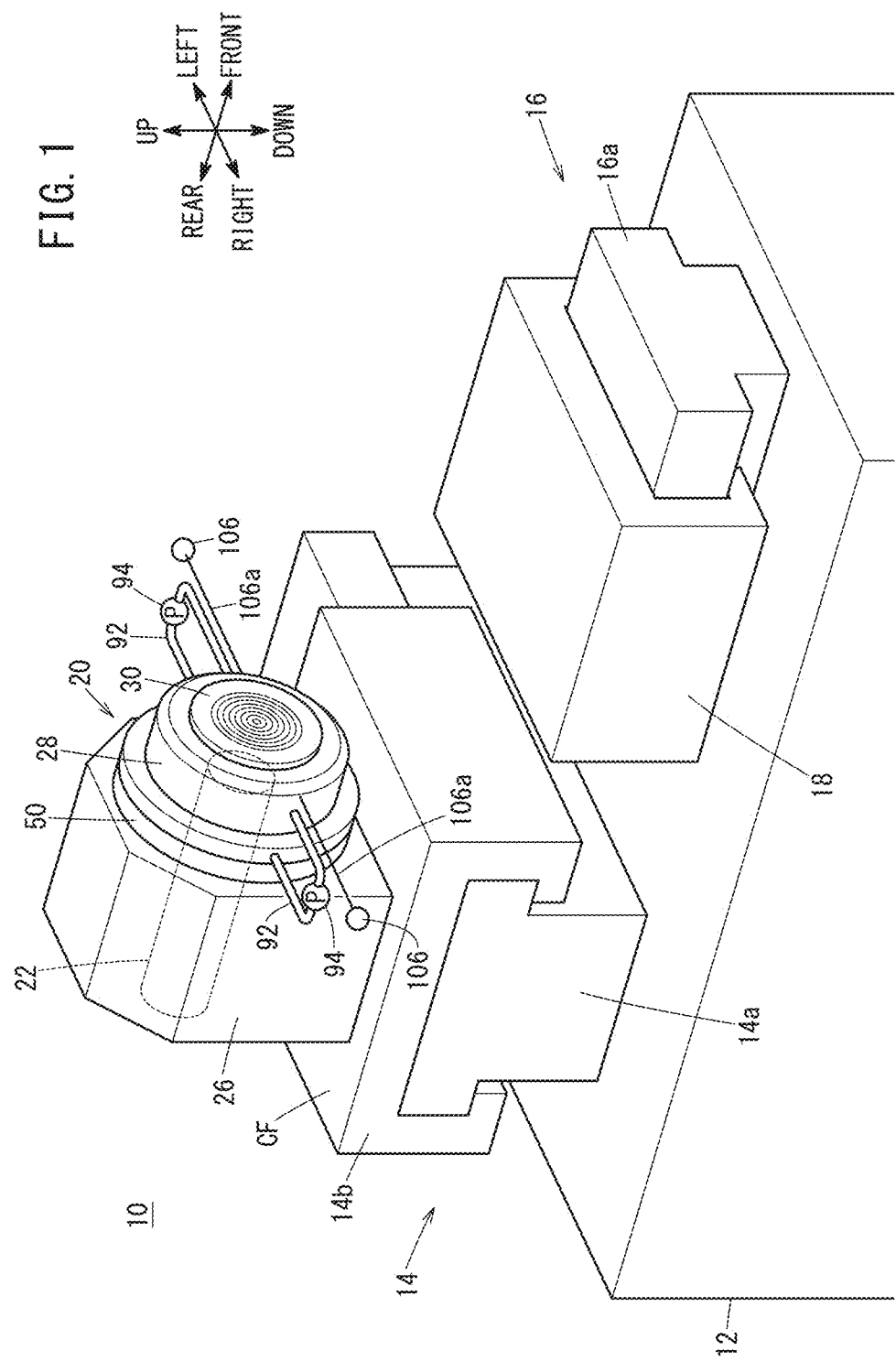
FIG. 1 is a schematic view showing a lathe according to the present embodiment.

FIG. 1 is a schematic view showing an appearance configuration of a lathe machine 10. The lathe machine 10 is used to machine a workpiece to be machined using a tool, and includes a base bed 12, a spindle support 14, a table support 16, a table 18 and a spindle device 20.

The spindle support 14 is provided on the base bed 12 to support the spindle device 20 so that it can move left and right relative to the base bed 12. Here, the direction (axial direction) in which a spindle shaft 22 of the spindle device 20 extends is referred to as the front-rear direction, the direction perpendicular to the axial direction in a plane parallel to a mounting surface CF on which the spindle device 20 is mounted is referred to as the left-right direction, and the direction perpendicular to the mounting surface CF and the axial direction is referred to as the up-down direction. The downward direction is the direction of gravity. Further, in the spindle device 20, one end side of the spindle shaft 22 on which a chuck portion 30 is arranged is defined as the front side, whereas the other end side of the spindle shaft 22 is defined as the rear side.

The spindle support 14 includes a first slider 14a provided along the left-right direction on the base bed 12, a spindle carriage 14b movable along the first slider 14a, and an unillustrated first drive mechanism for driving the spindle carriage 14b.

The first drive mechanism includes a motor and components such as a ball screw and others that convert the rotational motion of the motor into a linear motion. As spindle carriage 14b is moved along the first slider 14a by the first drive mechanism, the spindle device 20 on the spindle carriage 14b is moved left and right relative to the base bed 12.

The table support 16 is arranged on the base bed 12 to movably support the table 18 in the front-rear direction with respect to the base bed 12. The table support 16 includes a second slider 16a provided along the front-rear direction on the base bed 12 and an unillustrated second drive mechanism for driving the table 18 that is movable along the second slider 16a.

The second drive mechanism includes a motor and components such as a ball screw that converts the rotational motion of the motor into a linear motion. The table 18 is moved in the front-rear direction relative to the base bed 12 through the second slider 16a by the second drive mechanism. The table 18 may be provided rotatably about a vertical axis as a rotation axis.

In this embodiment, it is assumed that the workpiece is held by the chuck portion 30 of the spindle device 20 and the tool is held by the table 18. However, the tool may be held by the chuck portion 30 of the spindle device 20 and the workpiece may be held by the table 18.

Figure 2:
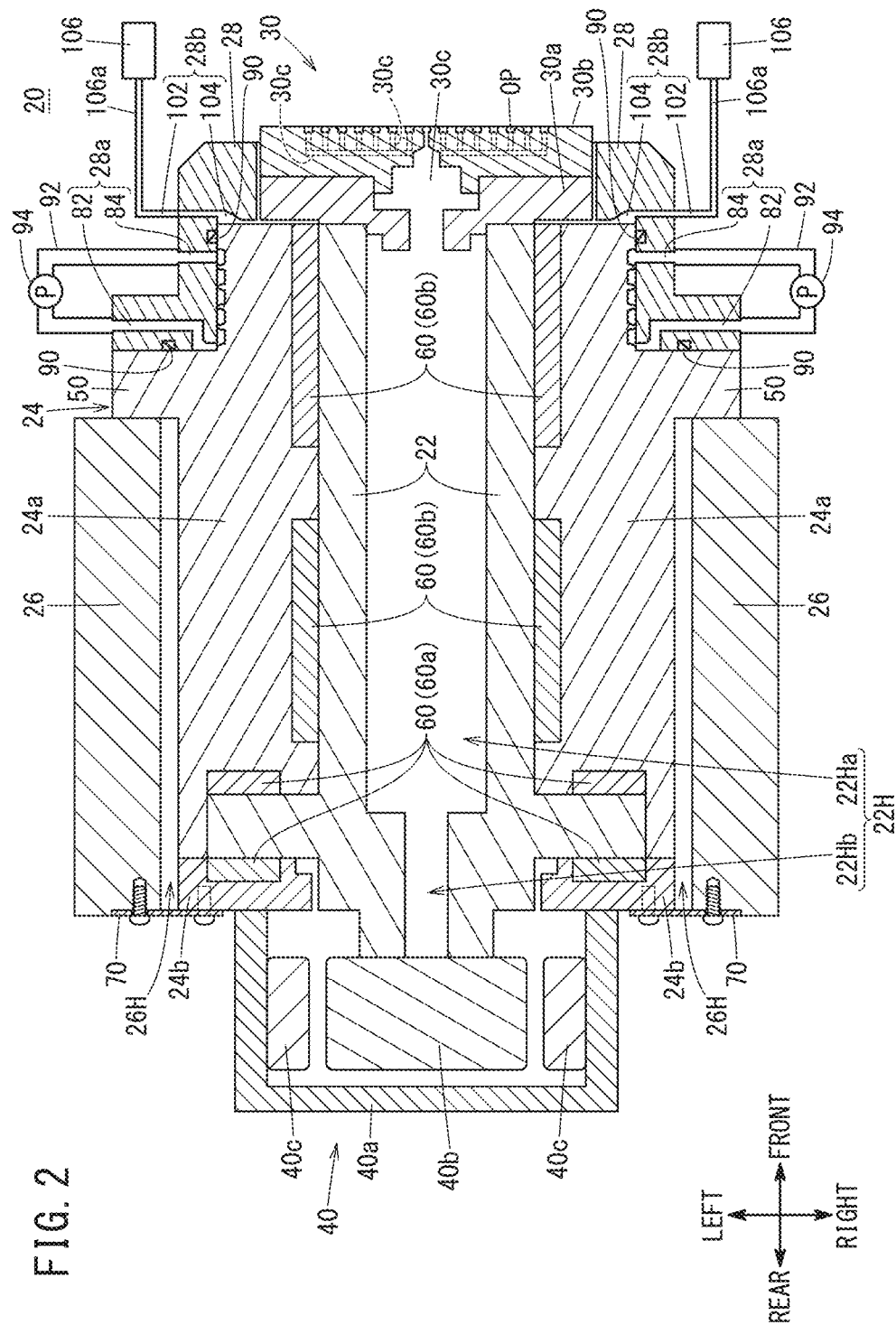
FIG. 2 is a schematic view showing a cross-sectional view of a spindle device of FIG. 1.

FIG. 2 is a sectional view showing the spindle device 20 of FIG. 1. The spindle device 20 of the present embodiment rotatably holds a workpiece, and is used, for example, to machine the workpiece at nanometer-scale control. The spindle device 20 contains, as main components, the spindle shaft 22, a spindle housing 24, a spindle mount 26, and a cover member 28.

The spindle shaft 22 is a cylindrical member and has a cylindrical through-hole 22H penetrating therethrough in the axial direction. In the example shown in FIG. 2, the through-hole 22H has a front side through-hole 22Ha and a rear side through-hole 22Hb having a diameter smaller than that of the front side through-hole 22Ha. The chuck portion 30 is arranged on one end (front side) of the spindle shaft 22, and a motor 40 is provided on the other end (rear side).

The chuck portion 30 is a rotating member that is provided at the one end of the spindle shaft 22 so as to be rotatable in conjunction with rotation of the spindle shaft 22, on the front surface of the spindle housing 24, and in the present embodiment, the chuck portion 30 holds and releases the workpiece. Here, in FIG. 1, although the chuck portion 30 is formed in a disk shape, it may have another shape. The chuck portion 30 has a base 30a fixed on the front side of the spindle shaft 22 and a suction pad 30b detachably attached to the base 30a. The suction pad 30b has openings OP formed in a suction surface thereof. The base 30a and the suction pad 30b contain therein a communication passage 30c to establish communication between openings OP and one end of the through-hole 22H in the spindle shaft 22. In the chuck portion 30, air outside the chuck portion 30 is drawn into the through-hole 22H from the openings OP through the communication passages 30c by an unillustrated vacuum pump, to thereby keep and hold the workpiece in close contact with the suctioning face.

The motor 40 is a drive source of the spindle shaft 22 and includes a motor case 40a attached on the rear side of the spindle housing 24, and also includes a rotor 40b and a stator 40c provided inside the motor case 40a. The spindle shaft 22 is fixed to the rotor 40b. Therefore, the spindle shaft 22 rotates together with the rotor 40b.

The spindle housing 24 includes a substantially cylindrical housing body 24a and a rear housing lid 24b. The housing body 24a is provided with an annular flange portion 50 projecting outward from the outer peripheral surface of the housing body 24a. The flange portion 50 may be formed integrally with the housing body 24a, or may be formed separately from the housing body 24a and fixed to the housing body 24a by predetermined fasteners.

The rear housing lid 24b is removably attached on the rear side of the housing body 24a so as to cover the opening on the rear of the housing body 24a. The motor case 40a of the motor 40 is fixed to the outer (rear endface) side of the rear housing lid 24b.

A substantially cylindrical space for shaft arrangement is defined by the rear housing lid 24b and the housing body 24a so as to extend therethrough in the front-rear direction. The spindle shaft 22 is arranged in the shaft arrangement space, and the spindle shaft 22 arranged in the shaft arrangement space is rotatably supported by bearings 60.

The bearings 60 include thrust bearings 60a and radial bearings 60b in this embodiment. The thrust bearings 60a are arranged on the left and right sides of the spindle shaft 22. The radial bearings 60b are provided on the front and rear sides of a front portion of the spindle shaft 22 that is located at the front side of the thrust bearings 60a. The bearing 60 may be a hydrostatic bearing or a rolling bearing. In the case where the machining on the workpiece should be controlled on a nanometer-scale as mentioned above, use of a hydrostatic bearing is preferable.

The spindle mount 26 is placed on the mounting surface CF (FIG. 1) of the spindle carriage 14b. The spindle mount 26 has an insertion cavity 26H into which the spindle housing 24 is inserted along the axial direction of the spindle shaft 22. The front side of the spindle housing 24 inserted in the insertion cavity 26H is fixed to the front side of the spindle mount 26 by the flange portion 50 provided on the housing body 24a, and the rear side of the spindle housing 24 is supported by a support member 70 provided on the rear side of the spindle mount 26.

Specifically, the flange portion 50 is detachably fixed to the front side (one end that is closer to one opening of the insertion cavity 26H) of the spindle mount 26 by rod-shaped fasteners such as bolts. On the other hand, the support member 70 supports the spindle housing 24 by using, a base, the rear side (the other end that is closer to the other opening of the insertion cavity 26H) in the spindle mount 26. That is, the spindle housing 24 is supported on the spindle mount 26 at two ends, or at front and rear of the spindle housing 24.

The cover member 28 is a cover member which temperature is adjusted. The cover member 28 is arranged on the front side of the spindle device 20. Specifically, the cover member 28 is provided so as to cover the front-side surface of the flange portion 50, the outer peripheral surface of the housing body 24a extending forward from the front-side surface, and part of the outer peripheral surface of the chuck portion 30. Although the cover member 28 covers part of the outer peripheral surface of the chuck portion 30, it may be arranged so as to cover the whole of the outer peripheral surface.

In the cover member 28, a coolant flow path 28a for flowing a coolant for adjusting the temperature of the cover member 28 is formed. The coolant may be a liquid such as water or may be a gas. In the case of the present embodiment, the coolant flow path 28a is formed on each of the left and right sides of the cover member 28.

Figure 3:
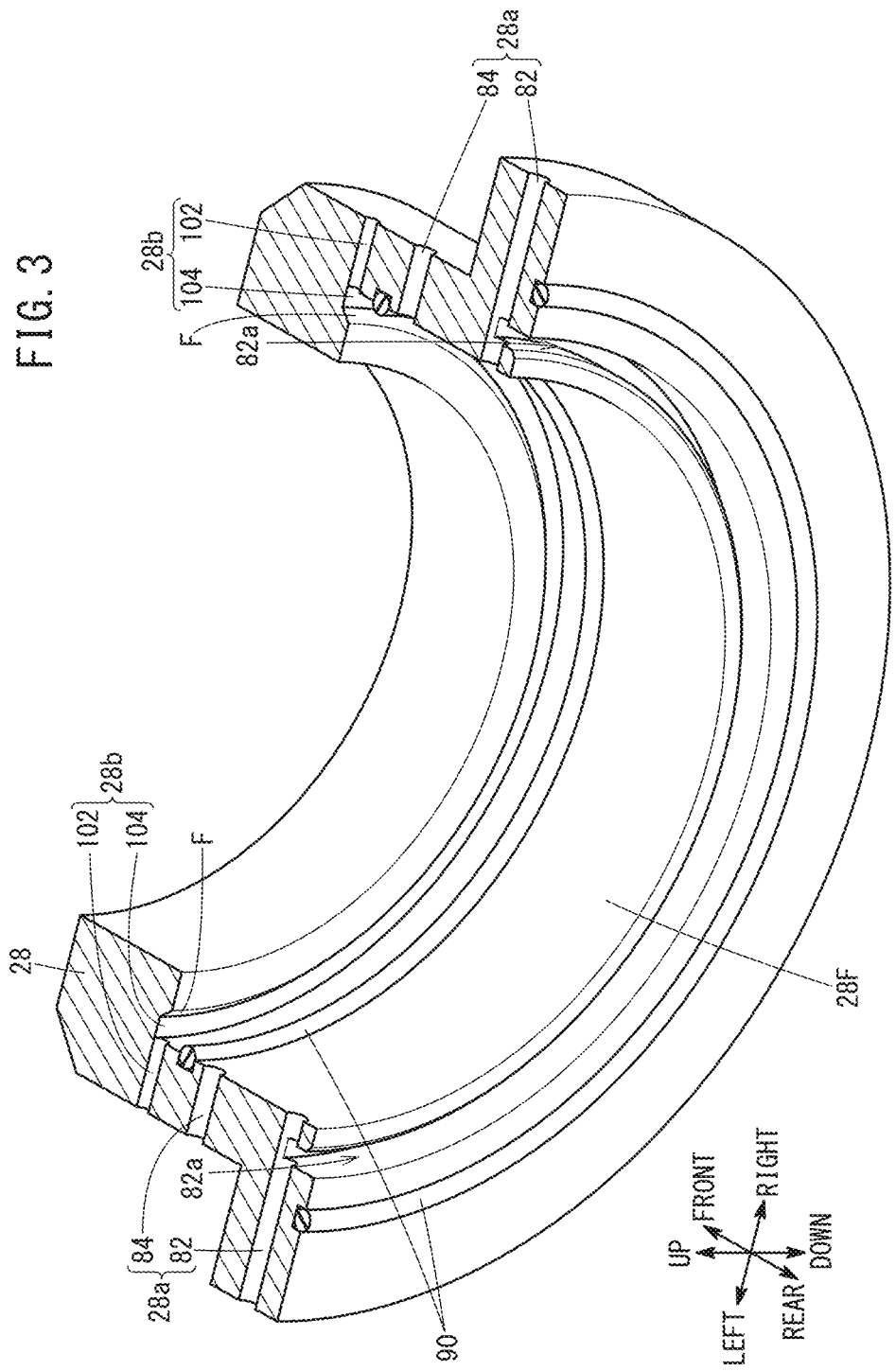
FIG. 3 is a schematic perspective view of a cover member.
Figure 4:
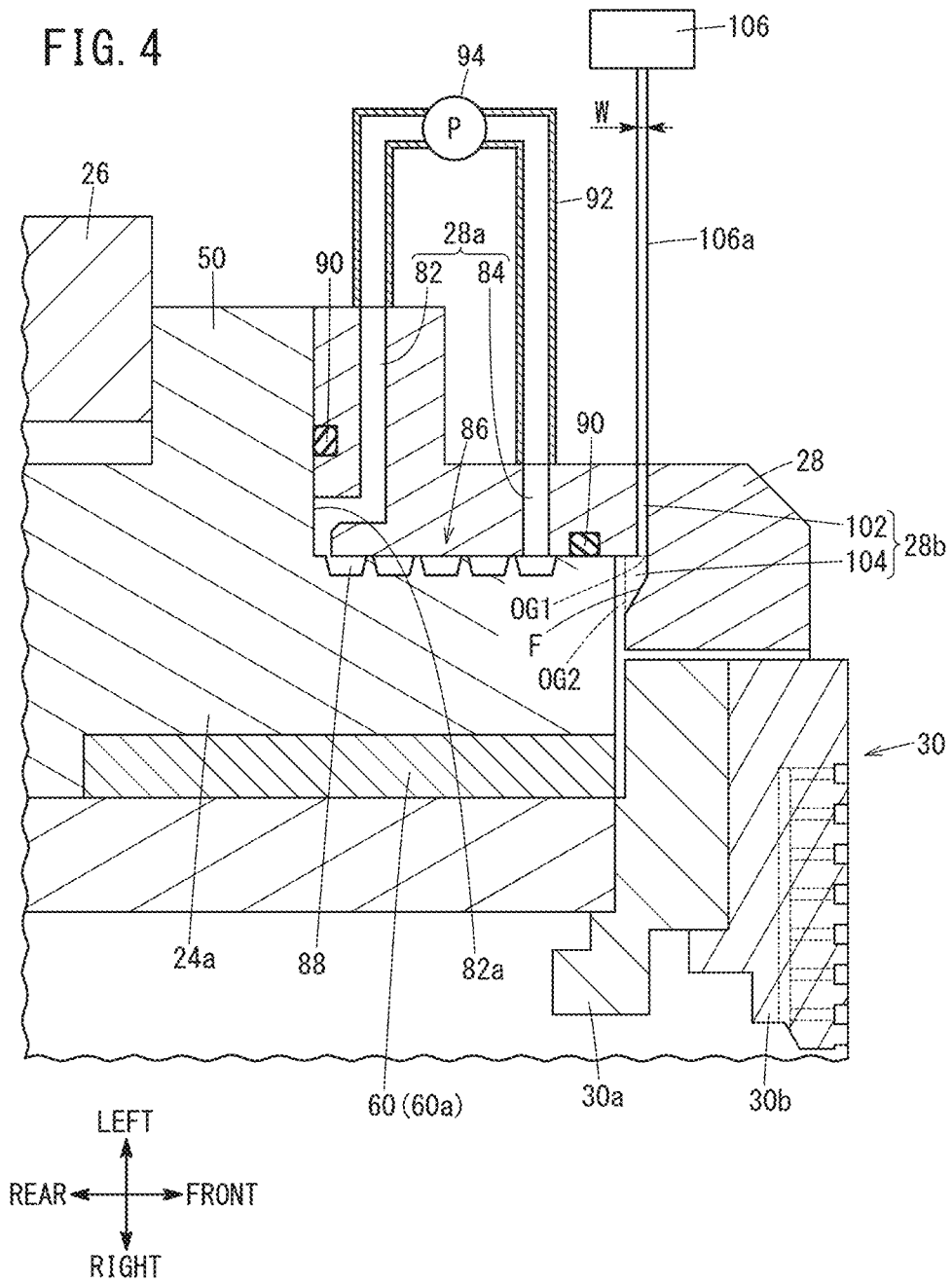
FIG. 4 is an enlarged view of part of FIG. 2.

FIG. 3 is a schematic perspective view of the cover member 28, and FIG. 4 is an enlarged view of part of FIG. 2. Specifically, FIG. 3 shows a perspective view of part of the cover member 28 as viewed from the rear side, and FIG. 4 shows an enlarged view of the coolant flow path 28a on the left side of the cover member 28 and its surroundings.

The coolant flow path 28a has a first conduit 82 and a second conduit 84. The first conduit 82 allows the outside of the cover member 28 to communicate with the front face of the flange portion 50 covered by the cover member 28. In the present embodiment, the first conduit 82 has an annular portion 82a, which extends circularly along the whole circumference of the flange portion 50 in a state of being in contact with the front face of the annular flange portion 50 covered by the cover member 28 (See FIG. 3).

The second conduit 84 allows the outside of the cover member 28 to communicate with the outer peripheral surface of the housing body 24a covered by the cover member 28. The second conduit 84 and the first conduit 82 are connected via a relay passage 86. The relay passage 86 is a gap (space) formed between the housing body 24a extending forward from the front face of the flange portion 50 and the cover member 28.

The inner peripheral surface 28F (see FIG. 3) of the cover member 28 defining the relay passage 86 is formed into an annular shape. Meanwhile, on the outer peripheral surface of the housing body 24a defining the relay passage 86, a helical groove 88 (see FIG. 4) is formed which extends helically toward the front side of the spindle shaft 22.

A seal member 90 that prevents the coolant from flowing out to the outside is arranged in a portion of the cover member 28 that is positioned more outward than the opening of the first conduit 82, in the contact area between the cover member 28 and the outer peripheral surface of the housing body 24a. Another seal member 90 is arranged in another portion of the cover member 28 that is positioned more outward than the opening of the second conduit 84, in the contact area between the cover member 28 and the housing body 24a. Here, specific examples of the seal member 90 include an O-ring and the like.

The opening on the outer side of the first conduit 82 and the opening on the outer side of the second conduit 84 are connected via a tube 92 that is disposed outside the cover member 28. The tube 92 is provided with a pump 94.

The coolant in the tube 92 flows into the first conduit 82 by action of the pump 94. The coolant that has entered the first conduit 82 flows through the annular portion 82a of the first conduit 82, on the front side of the flange portion 50 while being in partial contact with the front face of the flange portion 50, and enters the relay passage 86. The coolant having flowed into the relay passage 86 flows toward the second conduit 84. Specifically, the coolant having flowed into the relay passage 86 flows through the helical groove 88 formed in the outer peripheral surface of the housing body 24a surrounding the relay passage 86, and flows circumferentially or helically in the circumferential direction of the spindle shaft 22 on the outer peripheral surface of the housing body 24a, and then enters the second conduit 84. The coolant having flowed into the second conduit 84 flows out into the tube 92, and is then returned to the first conduit 82 by the pump 94. Thus, the coolant circulates inside and outside the cover member 28 so as to control the temperature of the cover member 28 by the circulating coolant.

Here, both the coolant flowing into the first conduit 82 of the coolant flow path 28a formed on the left side of the cover member 28 and the coolant flowing into the first conduit 82 of the coolant flow path 28a formed on the right side of the cover member 28, flow in the same single relay passage 86. Further, the coolant flowing through the relay passage 86 flows out into the second conduit 84 of the coolant flow path 28a formed on the left side of the cover member 28 and into the second conduit 84 of the coolant flow path 28a formed on the right side of the cover member 28. That is, the relay passage 86 is used in common by the circulation path formed on the left side of the cover member 28 and the circulation path formed on the right side of the cover member 28.

In addition to the coolant flow path 28a, the cover member 28 has, formed therein, a gas flow path 28b for flowing a compressed gas for sealing a portion to be sealed. The portion to be sealed is a gap between the chuck portion 30 and the cover member 28 and a gap between the chuck portion 30 and the housing body 24a. The compressed gas is a gas compressed to a predetermined pressure. Examples of the gas include air and others.

The gas flow path 28b is formed closer to the chuck portion 30 than the seal member 90 provided on the front side of the opening position of the second conduit 84. Here, the coolant flow path 28a is formed closer to the flange portion 50 than the seal member 90 provided on the front side of the opening position of the second conduit 84. In the case of the present embodiment, the gas flow path 28b is formed on each of the left and right sides of the cover member 28 (see FIG. 2).

A compressor 106 (see FIGS. 2 and 4) is connected to the inlet of the gas flow path 28b. In the case of the present embodiment, the gas flow paths 28b on the left and right sides have the respective compressors 106 connected thereto (see FIG. 2). However, a single compressor 106 may be connected to both the gas flow paths 28b on the left and right sides.

The compressor 106 outputs a compressed gas, and the compressed gas supplied from the compressor 106 flows into the gas flow path 28b through a hose 106a, passes through the gas flow path 28b, and is supplied to the portion to be sealed. As a result, it is possible to prevent chips generated during machining the workpiece, the coolant used at the time of machining, etc., from entering the interior (shaft arrangement space) of the spindle housing 24 through the gap, i.e., the sealed portion. The seal gas having passed through the sealed portion is discharged to the outside from the front side of the spindle device 20 and the like.

The gas flow path 28b has a first conduit 102 and a second conduit 104 (see FIGS. 3 and 4). The first conduit 102 communicates with the outside on the outer peripheral side of the cover member 28. In the present embodiment, the width W of the first conduit 102 is substantially constant along the entire first conduit 102, but the width of the first conduit 102 may change at a point or at multiple points. The width W of the first conduit 102 is defined as the dimension (linear distance) that is the greatest in the direction perpendicular to the direction in which the gas flow path 28b extends. The hose 106a of the compressor 106 is connected to the inlet of the first conduit 102.

The second conduit 104 allows the first conduit 102 to communicate with the gap between the chuck portion 30 and the housing body 24a, and is formed into an annular shape (see FIG. 3). The second conduit 104 has a space greater than the outlet OG1 of the first conduit 102. The outlet OG2 of the second conduit 104 faces toward the surface (the front face of the housing body 24a) of the housing body 24a that the chuck portion 30 faces.

The wall surface surrounding the second conduit 104 has an impinging surface F against which the compressed gas flowing out of the first conduit 102 impinges. The wall surface surrounding the second conduit 104 means the wall surface of the partition wall of the cover member 28 defining the second conduit 104. The impinging surface F is inclined with respect to the outlet OG2 of the second conduit 104 so that the compressed gas flowing out of the first conduit 102 is directed to the gap between the chuck portion 30 and the housing body 24a. Although the impinging surface F is formed over the entire circumference of the annular second conduit 104 in the example shown in FIG. 3, the impinging surface may and should be formed on at least a portion of the wall surface against which the compressed gas flowing out from the first conduit 102 impinges.

In the gas flow path 28b, the compressed gas fed from the compressor 106 flows into the first conduit 102, passes through the first conduit 102, and then enters the second conduit 104 from the outlet OG1 of the first conduit 102. The compressed gas that has entered the second conduit 104 collides with the impinging surface F and flows out from the outlet OG2 of the second conduit 104 along the impinging surface F, and advances toward the gap between the chuck portion 30 and the housing body 24a.

In the gas flow path 28b, the second conduit 104 is larger than the first conduit 102. For this reason, the compressed gas flowing from the first conduit 102 into the second conduit 104 will adiabatically expand, so that the temperature of the compressed gas may decrease. Even in this case, as the compressed gas collides with the impinging surface F of the partition wall of the cover member 28 whose temperature is adjusted, the temperature of the compressed gas is easy to approach the temperature of the cover member 28. Therefore, local variations in temperature in the housing body 24a whose outer peripheral side is covered by the cover member 28, which otherwise would have been caused by the compressed air, are unlikely to occur.

Thus, according to the spindle device 20 of the present embodiment, thermal deformation of the housing body 24a due to local temperature variations in the housing body 24a can be reduced, so that it is possible to suppress the decrease in machining accuracy due to the thermal deformation of housing body 24a.

[Modifications]

Though the above embodiment has been described as one example of the present invention, the technical scope of the present invention should not be limited to the above embodiment. It goes without saying that various modifications and improvements can be added to the above embodiment. It is also apparent from the scope of the claims that embodiments added with such modifications and improvements should be incorporated in the technical scope of the invention.

Examples in which the above embodiment is modified or improved will be described below.

(Modification 1)

Figure 5:
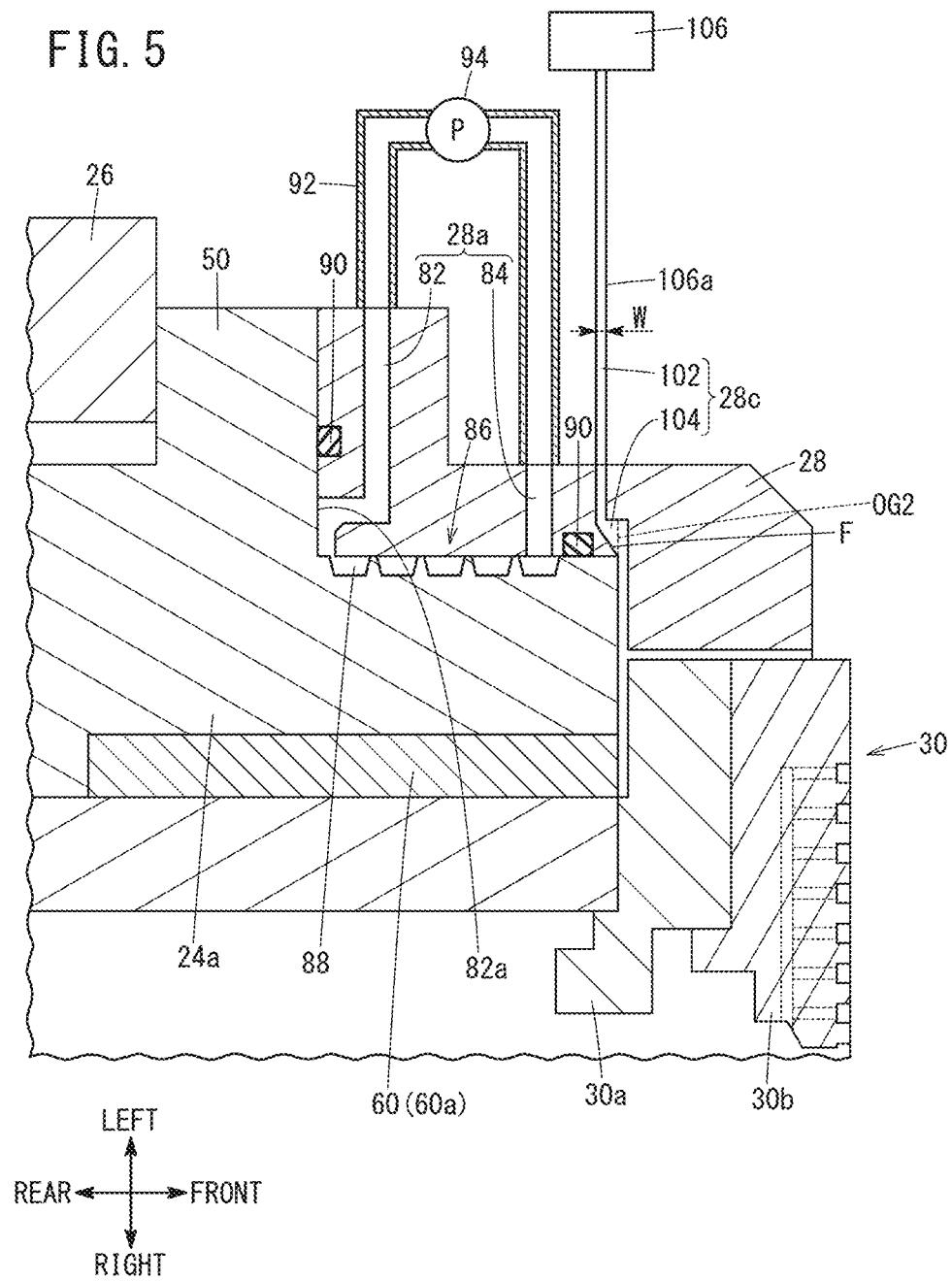
FIG. 5 is a view showing a gas flow path of Modification 1, viewed from the same viewpoint as in FIG. 4.

FIG. 5 is a view showing a gas flow path 28c of Modification 1, viewed from the same viewpoint as FIG. 4. The gas flow path 28c of Modification 1 is formed at a position different from that of the gas flow path 28b of the embodiment.

That is, the gas flow path 28b of the embodiment allows the exterior on the outer peripheral side of the cover member 28 to communicate with the front face of the housing body 24a, whereas the gas flow path 28c of Modification 1 allows the exterior on the outer peripheral side of the cover member 28 to communicate with the outer peripheral surface of the housing body 24a.

The impinging surface F of the partition wall of the cover member 28 forming the second conduit 104 in the gas flow path 28c of Modification 1 is inclined so as to come closer to the front side of the cover member 28 as it goes from the outer peripheral side to the interior side of the cover member 28.

In the gas flow path 28c of Modification 1, as in the above embodiment, even if the compressed gas flowing into the second conduit 104 adiabatically expands and the temperature of the compressed gas is lowered, the temperature of the compressed gas is easy to approach the temperature of the cover member 28 when the compressed gas collides with the impinging surface F of the partition wall of the cover member 28. Therefore, similarly to the above embodiment, it is possible to reduce the thermal deformation of the housing body 24a due to local variations in temperature in the housing body 24a.

(Modification 2)

Figure 6:
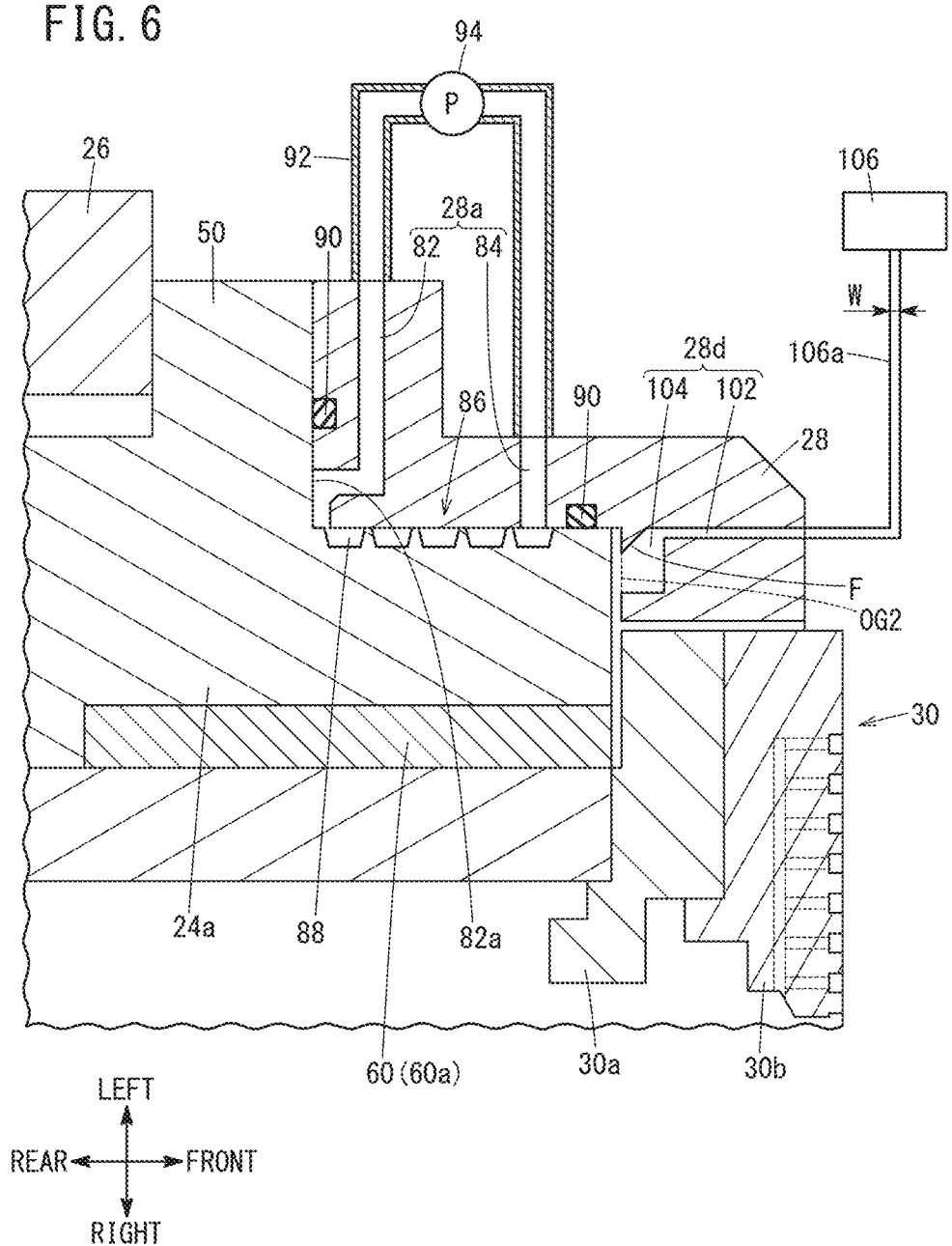
FIG. 6 is a view showing a gas flow path of Modification 2, viewed from the same viewpoint as in FIG. 4.

FIG. 6 is a view showing a gas flow path 28d of Modification 2, viewed from the same viewpoint as FIG. 4. The gas flow path 28d of Modification 2 is formed at a position different from that of the gas flow path 28b of the embodiment.

That is, the gas flow path 28b of the embodiment allows the exterior on the outer peripheral side of the cover member 28 to communicate with the front face of the housing body 24a, whereas the gas flow path 28d of Modification 2 allows the exterior on the front side of the cover member 28 to communicate with the front side of the housing body 24a. In this case, however, the first conduit 102 of the gas flow path 28d may be constructed to extend from the exterior on the outer peripheral side of the cover member 28 toward the spindle shaft 22 and then be deflected or bent toward the front face of the housing body 24a so that exterior on the outer peripheral side of the cover member 28 is put in communication with the front face of the housing body 24a. The impinging surface F of the partition wall of the cover member 28 forming the second conduit 104 in the gas flow path 28d of Modification 2 is inclined so as to approach the spindle shaft 22 as it goes from the front side to the rear side of the cover member 28.

In the gas flow path 28d of Modification 2, as in the above embodiment, even if the compressed gas flowing into the second conduit 104 adiabatically expands and the temperature of the compressed gas is lowered, the temperature of the compressed gas is easy to approach the temperature of the cover member 28 when the compressed gas collides with the impinging surface F of the partition wall of the cover member 28. Therefore, similarly to the above embodiment, it is possible to reduce the thermal deformation of the housing body 24a due to local variations in temperature in the housing body 24a.

(Modification 3)

Figure 7:
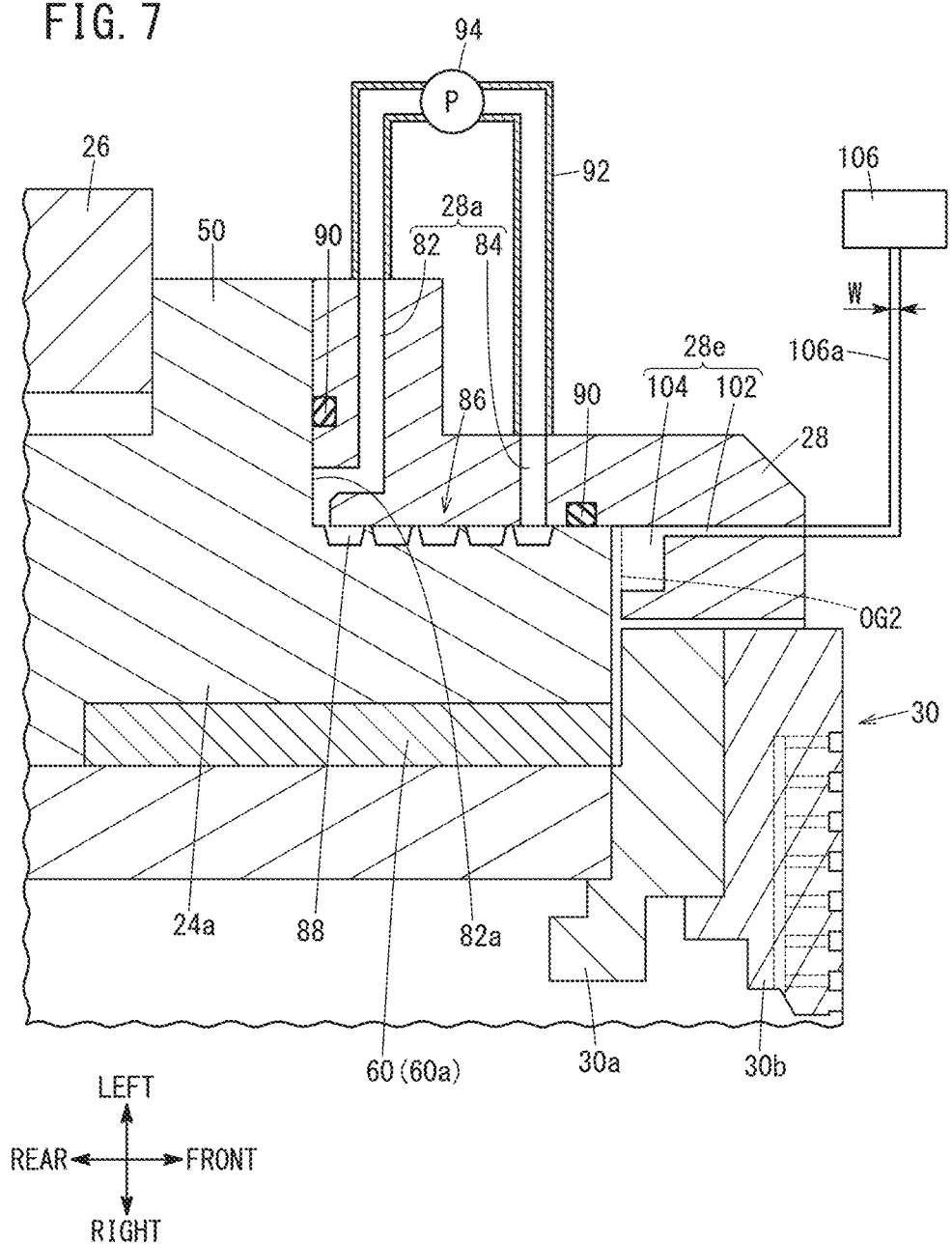
FIG. 7 is a view showing a gas flow path of Modification 3, viewed from the same viewpoint as in FIG. 4.

FIG. 7 is a view showing a gas flow path 28e of Modification 3, viewed from the same viewpoint as FIG. 4. The gas flow path 28e of Modification 3 differs from the gas flow path 28d of Modification 2 in that the impinging surface F (see FIG. 6) of the gas flow path 28d of Modification 2 is eliminated.

In the gas flow path 28e of Modification 3, the compressed gas supplied from the compressor 106 enters the first conduit 102, flows through the first conduit 102, and flows into the second conduit 104. The compressed gas that has entered the second conduit 104 flows out from the outlet OG2 of the second conduit 104, collides with the front face of the housing body 24a, and then goes forward to the gap between the chuck portion 30 and the housing body 24a.

In the gas flow path 28e of Modification 3, although there is no impinging surface F (see FIG. 6), the gas collides with the front face of the housing body 24a as described above. The housing body 24a is covered by the cover member 28 in a temperature-adjusted state, hence the temperature of the housing body varies to substantially the same extent as that of the cover member 28. Therefore, even if the temperature of the compressed gas is lowered due to adiabatic expansion, the temperature of the gas is likely to approach the temperature of the housing body 24a which has varied to the same extent as the temperature of the cover member 28 at least when colliding with the housing body 24a. As a result, as in the above embodiment, the thermal deformation of the housing body 24a due to the local variations in temperature in the housing body 24a can be reduced.

In the case where the impinging surface F is formed as in each of the gas flow paths 28b to 28d in the above-described embodiment and Modifications 1 and 2, the compressed gas directly collides with the temperature-adjusted cover member 28, so that the temperature of the gas can easily get closer to the adjusted temperature.

(Modification 4)

In the above embodiment, the first conduit 102 in the gas flow path 28b extends substantially straight, but may extend in a curved manner. Similarly, the first conduit 102 in the gas flow paths 28c to 28e of Modifications 1 to 3 may extend in a curved manner.

(Modification 5)

Though in the above embodiment, the coolant flow path 28a is formed on each of the left and right sides of the cover member 28, the left or right side coolant flow path 28a may be omitted. In addition, as long as the coolant flow path 28a has a configuration that can flow a coolant for adjusting the temperature of the cover member 28, the arrangement, shape and the presence or absence of circulation, etc., of the coolant flow path 28a are not particularly limited. Further, in the above embodiment, the relay passage 86 is provided between the cover member 28 and the housing body 24a. However, the relay passage 86 may be provided inside the cover member 28, and as long as it allows the first conduit 82 to communicate with the second conduit 84, the arrangement, the shape, etc., of the relay passage 86 are not particularly limited. In short, any configuration is possible as long as the temperature of the cover member 28 can be adjusted by the coolant.

The above-mentioned embodiment and the above-mentioned Modifications may be combined arbitrarily as long as no technical inconsistency occurs.

[Technical Ideas]

Technical ideas that can be grasped from the above-described embodiment and Modifications will be described below.

The spindle device (20) includes a spindle housing (24), a spindle shaft (22), a rotating member (30), a flange portion (50), and a cover member (28).

The spindle shaft (22) is rotatably supported inside the spindle housing (24). The rotating member (30) is disposed at one end of the spindle shaft (22) and configured to be rotatable in conjunction with rotation of the spindle shaft (22). The flange portion (50) is formed into an annular shape and projects outward from the outer peripheral surface of the spindle housing (24). The cover member (28) is configured to cover the surface of the flange portion (50) on the one end side of the spindle shaft (22), the outer peripheral surface of the spindle housing (24) that extends from the surface of the flange portion toward the one end side of the spindle shaft (22), and the outer peripheral surface of the rotating member (30), the temperature of the cover member being adjusted.

The cover member (28) has, formed therein, a gas flow path (28b to 28e) configured to flow a compressed gas for providing sealing between the rotating member (30) and the cover member (28) and sealing between the rotating member (30) and the spindle housing (24).

The gas flow path (28b to 28e) includes a first conduit (102) and a second conduit (104). The first conduit (102) communicates with the outside of the cover member (28). The second conduit (104) allows the first conduit (102) to communicate with the gap between the rotating member (30) and the spindle housing (24), the second conduit being larger than the outlet (OG1) of the first conduit (102). The outlet (OG2) of the second conduit (104) is configured to face the surface of the spindle housing (24).

In the thus configured spindle device (20), since the outlet (OG2) of the second conduit (104) faces the spindle housing (24), the compressed gas entering the second conduit (104) from the first conduit (102) flows out from the second conduit (104) and collides with the spindle housing (24).

Since the spindle housing (24) is covered by the cover member (28) whose temperature is adjusted, the temperature of the gas varies to substantially the same extent as that of the cover member (28). Therefore, even if the temperature of the compressed gas is lowered due to adiabatic expansion, the temperature of the gas is likely to approach the temperature of the spindle housing (24) which has varied to the same extent as the temperature of the cover member (28) at least when the gas collides with the spindle housing (24). Therefore, it is possible to prevent large local temperature variations in the spindle housing (24) caused by the compressed gas, and hence it is possible to reduce the occurrence of thermal deformation in the spindle housing (24) due to the local temperature variation. As a result, it is possible to suppress the decrease in machining accuracy due to thermal deformation of the spindle housing (24).

The wall surface surrounding the second conduit (104) preferably has an impinging surface (F) against which the compressed gas flowing out from the first conduit (102) collides. This configuration causes the compressed gas flowing into the first conduit (102) to directly collide with the temperature-controlled cover member (28), so that the temperature of the gas can be easily reduced to the adjusted temperature. Therefore, it is possible to further suppress increase in local temperature difference in the spindle housing (24) due to the compressed gas.

The impinging surface (F) is preferably inclined with respect to the outlet (OG2) of the second conduit (104) such that the compressed gas flowing out of the first conduit (102) is directed to the gap. This configuration makes it possible to suppress the reduction in the flow velocity of the compressed gas colliding with the impinging surface (F) as compared to the case where there is no inclination.

The second conduit (104) is preferably formed into an annular shape. The configuration of the second conduit (104) in an annular shape makes it possible to alleviate the uneven pressure distribution in the circumferential direction, of the compressed gas flowing out from the first conduit (102), and hence it is possible to supply the compressed gas around the spindle shaft (22) in such a pressure distribution state. Therefore, it is possible to prevent the spindle shaft (22) from being vibrated by the compressed gas being locally supplied around the spindle shaft (22).

The cover member (28) has a seal member (90) configured to seal part of a gap between the outer peripheral surface of the spindle housing (24) and the cover member (28) and a coolant flow path (28a) formed closer to the flange portion (50) than the seal member (90) is and configured to flow a coolant for adjusting the temperature of the cover member (28). In addition, the gas flow path (28b to 28e) is formed closer to the rotating member (30) than the seal member (90) is. With this configuration, it is possible to suppress the mixing of the coolant with the compressed gas for sealing, while adjusting the temperature of the cover member (28) with the coolant.

The present invention is not particularly limited to the embodiment described above, and various modifications are possible without departing from the essence and gist of the present invention.

What is claimed is:

1. A spindle device comprising:
   a spindle housing;
   a spindle shaft configured to be rotatably supported inside, and rotatable relative to, the spindle housing;
   a rotating member disposed at one end of the spindle shaft and configured to be rotatable in conjunction with rotation of the spindle shaft;
   an annular flange portion projecting outward from an outer peripheral surface of the spindle housing; and
   a cover member covers a surface of the flange portion on one end side of the spindle shaft, an outer peripheral surface of a spindle housing portion that extends from the surface of the flange portion toward the one end side of the spindle shaft, and the cover member covers an outer peripheral surface of the rotating member, a temperature of the cover member being adjusted, wherein:
   the cover member has, formed therein, a gas flow path configured to flow a compressed gas for providing sealing between the rotating member and the cover member and sealing between the rotating member and the spindle housing;
   the gas flow path includes:
     a first conduit formed entirely inside the cover member such that the first conduit is bounded between a first conduit inlet on an outer peripheral surface of the cover member and a first conduit outlet only by a surface of the cover member;
     a second conduit formed inside the cover member such that the second conduit is bounded between the first conduit outlet and a second conduit outlet only by surfaces of the cover member, the second conduit being configured to allow the first conduit to communicate with a first gap between the rotating member and the spindle housing;
     wherein the second conduit has a space greater than the first conduit outlet and the second conduit has an impinging surface against which a compressed gas flowing out of the first conduit outlet impinges, wherein the impinging surface is inclined with respect to each of the second conduit outlet and the first conduit outlet;
     the second conduit outlet faces a surface of the spindle housing portion, wherein the second conduit outlet extends substantially parallel to the surface of the spindle housing portion; and
     wherein the first conduit outlet communicates directly with the second conduit.

2. The spindle device according to claim 1, wherein the impinging surface is inclined with respect to the outlet of the second conduit so that the compressed gas flowing out of the first conduit is directed to the first gap.

3. The spindle device according to claim 1, wherein the second conduit is formed into an annular shape.

4. The spindle device according to claim 1, wherein:
   the cover member includes:
     a seal member configured to seal part of a second gap between the outer peripheral surface of the spindle housing portion and the cover member; and
     a coolant flow path formed closer to the flange portion than the seal member is and configured to flow a coolant for adjusting the temperature of the cover member, and
   the gas flow path is formed closer to the rotating member than the seal member is.

* * * * *